United States Patent [19]
Ohorodnik et al.

[11] 3,843,743
[45] Oct. 22, 1974

[54] PRODUCTION OF MONOVINYLACETYLENE

[75] Inventors: Alexander Ohorodnik, Erftstadt Liblar; Klaus Gehrmann, Hurth-Knapsack; Günter Legutke, Bruhl; Hermann Vierling, Hurth, all of Germany

[73] Assignee: Knapsack Aktiengesellschaft, Knapsack near Cologne, Germany

[22] Filed: Oct. 9, 1973

[21] Appl. No.: 404,393

[30] Foreign Application Priority Data
Oct. 14, 1972 Germany.............................. 2250463

[52] U.S. Cl. ................................................. 260/678
[51] Int. Cl. ........................................... C07c 11/22
[58] Field of Search ............................ 260/678, 679

[56] References Cited
UNITED STATES PATENTS
2,934,576   3/1974   Goffinet .............................. 260/678
3,068,304   12/1962   Spector ............................. 260/678

FOREIGN PATENTS OR APPLICATIONS
1,096,344   12/1953   Germany .......................... 260/678

Primary Examiner—Delbert E. Gantz
Assistant Examiner—Juanita M. Nelson
Attorney, Agent, or Firm—Connolly and Hutz

[57] ABSTRACT

Improved production of monovinylacetylene by introducing acetylene, at temperatures between 40° and 100°C and under acetylene gas pressures between 0.01 and 10 atmospheres (gauge), into an aqueous, hydrochloric acid solution of copper (I) chloride (Nieuwland catalyst type solution). More particularly, there is added to the catalyst solution an organic monovinylacetylene-solvent boiling at temperatures higher than substantially 150°C, being immiscible therewith and containing at least 40 weight percent of indan together with further mononuclear aromates; the said catalyst solution and the said solvent are mechanically dispersed by introducing acetylene thereinto so as to obtain a homogeneous catalyst liquid having between 25 and 85 percent by volume of the solvent therein; monovinylacetylene is continually stripped off from the dispersed solvent, which is saturated with monovinylacetylene, by introducing an excess of acetylene gas thereinto; and pure monovinylacetylene is recovered from the issuing gas mixture.

3 Claims, No Drawings

PRODUCTION OF MONOVINYLACETYLENE

It is known that monovinylacetylene can be produced by introducing acetylene into an aqueous hydrochloric acid solution of copper (I) chloride/alkali metal chloride (Nieuwland catalyst) at temperatures between 40° and 100°C, at atmospheric or elevated pressure. This reaction, which does not stop at the monovinylacetylene stage, has been found to effect the addition of further quantities of acetylene to the terminal triple bond. For example, complex-bound monovinylacetylene undergoes further reaction with acetylene to hexadiene-1-ine (HC ≡ C—CH=CH—CH=CH$_2$), complex-bound acetylene further reacts with monovinylacetylene to divinylacetylene (H$_2$C=CH—C-≡C—CH=CH$_2$) or with 2 mols of monovinylacetylene to octatetraene. These by-products which have not been put to commercial use heretofore considerably impair the yield of desirable product. Aside from the loss of material caused thereby, the above byproducts give rise to considerable technological difficulties during operation, as they are readily polymerizable and combine this with readiness to form peroxides (e.g. divinylacetylene) with minor proportions of oxygen. These properties of polymeric acetylenes handicap the reaction and render operation hazardous. Attempts have therefore been made in industry to minimize the formation of by-products as far as possible.

German published Specification "Offenlegungsschrift" 1,543,129 describes a process for making monovinylacetylene by introducing acetylene at temperatures between 40° and 100°C, under acetylene gas pressures between 0.01 and 10 atmospheres (gauge) into an aqueous, hydrochloric acid solution of copper (I) chloride (Nieuwland catalyst type solution). More particularly, acetylene is introduced jointly and simultaneously with an inert organic solvent as an extractant and stripping agent for monovinylacetylene, into the catalyst solution. The solvent is used in vapor form and passed continuously through the catalyst solution and monovinylacetylene, originating from dimerized acetylene, is continuously removed therefrom by stripping. Following this, the issuing vapor mixture is freed from monovinylacetylene in known manner, by condensation and fractional distillation. Fully discussed in the above German published Specification "Offenlegungsschrift" 1,543,129 are the prior processes described in German Patent No. 1,054,989 and U.S. Pat. No. 2,934,576 for making monovinylacetylene from acetylene, and the disadvantages which are associated therewith.

While known processes permit the production of monovinylacetylene in yields of more than 80 percent, the fact remains (cf. the statements made in German Patent Specification No. 1,070,619, column 1, lines 36 – 40) that even slightly increased yields would be highly desirable and advantageous in view of the considerable commercial importance of monovinylacetylene production.

We have now unexpectedly discovered that it is possible for the monovinylacetylene yield to be considerably improved for substantially unchanged acetylene conversion rates. To this end, the present invention provides an improved process for making monovinylacetylene by introducing acetylene at temperatures between 40° and 100°C and under acetylene gas pressures between 0.01 and 10 atmospheres (gauge), into an aqueous, hydrochloric acid solution of copper (I) chloride (Nieuwland catalyst type solution), the improved process comprising adding to the catalyst solution an organic monovinylacetylene solvent boiling at temperatures higher than substantially 150°C, being immiscible therewith and containing at least 40 weight percent of indan together with further mononuclear aromates; mechanically dispersing the said catalyst solution and the said solvent by introducing acetylene thereinto with the resultant formation of a homogeneous catalyst liquid having between 25 and 85 percent by volume, preferably between 40 and 60 percent by volume, of the solvent therein; continually stripping off monovinylacetylene from the dispersed solvent, which is saturated with monovinylacetylene, by introducing an excess of acetylene gas thereinto; and recovering pure monovinylacetylene from the issuing gas mixture.

The preferred solvent is a coke plant-product substantially of the following composition, in weight percent.

| | |
|---|---|
| Xylenes: | 1 – 2 |
| Cumene: | 2 – 5 |
| Mesitylene: | 5 – 15 |
| Pseudocumene: | 10 – 20 |
| Indan: | 40 – 80, preferably 50 |
| Tetralin: | 5 – 15 |

This product is commercially available and marketed under the designation of "Arsol" by ARAL company.

As taught in German Patent Specification No. 1,070,619 and U.S. Pat. No. 2,934,576, it is possible for a customary Nieuwland catalyst to be used in admixture with certain aromatic hydrocarbons, such as toluene, xylene, cymene, mesitylene, tetralin, cetyl chloride, monochlorobenzene, orthodichlorobenzene or chloro-naphthalene, the aromates replacing aliphatic or cycloaliphatic hydrocarbons. It is often necessary, however, to also add one or more dispersing agents. These addends are not only intended to dissolve monovinylacetylene but also and more importantly to dissolve the considerable quantities of tar originating from polymeric by-products. A portion of the catalyst liquid is continuously removed and delivered to a calming zone, wherein it separates into two layers comprising an aqueous catalyst phase and an organic solvent phase. The former is repumped to the reactor and the latter, which contains tar products, consisting partially of peroxides and acetylides, and which is hazardous to remove by distillation, is generally discarded. It should also be borne in mind that the reactors containing the inhomogeneous catalyst liquid are fitted with agitators and circulation means. Continuous purification of the catalyst liquid by means of agitators and pumps is a commercially unattractive and costly procedure and, with the possibility in mind that peroxides and, for example copper acetylides, may well give rise to explosions, scarcely safe enough to justify use thereof in modern commercial plants producing monovinylacetylene. More particularly splashes of catalyst liquid urged into contact with the wall of the reactor by the paddle or blade mixers are not always rinsed away timely enough. As a result, dry and highly explosive copper acetylide is found to adhere to the inside wall of the reactor.

While U.S. Pat. No. 2,934,576 at first glance would appear, aside from the disadvantageous phenomena reported above, to enable very good acetylene conversion rates and monovinylacetylene yields to be produced, the fact remains that the experiments therein were made with merely 10 cc of catalyst liquid and for a mere period between 45 and 165 minutes. Despite this, the catalyst activity was found to drop considerably, after a short while. In this process, merely the quantity of acetylene which just undergoes dissolution and reaction is added to the catalyst solution. Such small-scale experiments, however, disclose nothing that would be applicable to the commercial production of monovinylacetylene, wherein it is necessary for the resulting monovinylacetylene to be always expelled from the catalyst liquid by means of considerable excess proportions of acetylene.

Steps, which are taken in an attempt to improve the yield of desirable substance, should not impair the space/time-yield or render a process more costly as this is of prime importance to the economy of any process. It is also an important requirement for such improvement steps to avoid or substantially avoid the need for constructional modification of technical facilities.

The process of the present invention can be carried out in any existing reactor for making monovinylacetylene without the need to use pumps for the continuous removal and decontamination of the catalyst, or agitators and the like. The catalyst solution and the aromatic solvent, which is used in accordance with this invention and which has at least 40 weight percent of indan therein — this is characteristic of, and critical for, the present invention — have unexpectedly been found to produce a homogeneous catalyst emulsion, once acetylene is passed therethrough without any addition of dispersing agents. Indan (hydrindene) has a boiling point of 177°C (760 mm Hg), a density of 0.957 g/cc and is a very good solvent for monovinylacetylene. In other words, the aromatic solvent ensures particularly rapid extraction of monovinylacetylene from the aqueous catalyst solution and inhibits further reaction thereof. In the process of the present invention, it has been found unnecessary in continuous operation for a period of at least 1 year to open and clean the reactor charged with the catalyst liquid, which is difficult to handle. The catalyst liquid remained fully active in the absence of any formation of tar products. The only by-product of high molecular weight was divinylacetylene, which was obtained at a rate between 1 and 2 weight percent, based on the monovinylacetylene produced. The polymerization of divinylacetylene under the opertional conditions of the present invention gives merely rise to an extremely minor formation of products of higher molecular weight. This firstly in view of the fact that a very minor absolute quantity of divinylacetylene is obtained in the present process and secondly in view of the fact that the divinylacetylene immediately undergoes dissolution in the considerable quantity of aromatic solvent present and conversion to a form in which it is scarcely polymerizable. The concentration of divinylacetylene in the aromatic solvent cannot reasonably be expected to increase under the operational conditions selected as it escapes in gaseous form, for example at reaction temperatures between 70° and 80°C and under a gas load between 100 and 150 liters of gas per liter of catalyst per hour.

The present invention has also been found to ensure considerable technological advantages provided that use is made of one and the same aromatic solvent, for example "Arsol," both in the reactor for extracting the monovinylacetylene, and in the work-up for scrubbing the monovinylacetylene so as to obtain it in pure form (cf. German Patent No. 1,096,344, for example).

The step of separating the monovinylacetylene, which does not form part of the present invention, can be effected in art-recognized manner.

The composition of the Nieuwland catalyst solution does not form part of the invention. Use should, however, be made of a Nieuwland catalyst containing up to 0.5 weight percent, preferably between 0.1 and 0.2 weight percent, of free hydrochloric acid, if desired in admixture with known complex formers for copper (I) chloride, such as alkali metal chlorides, ammonium chlorides, amine-hydrochlorides or suitable mixtures thereof. In addition to this, the catalyst should preferably have a density between 1.3 and 1.8 grams/cc, more preferably 1.6 grams/cc.

Example 1 demonstrates the behaviour of a customary prior art Nieuwland catalyst.

Example 2 illustrates the improved yield which is obtained upon partial replacement of the catalyst solution by "Arsol."

It has already been reported that the acetylene conversion rate and the yield of monovinylacetylene obtained by dimerization of acetylene in a Nieuwland catalyst are influenced by the catalyst composition, acid concentration, catalyst density, reaction temperature, pressure and gas load. In order to eliminate the influence of these factors, use was made of a commercial catalyst rather than of a fresh catalyst. In addition to this all experiments werde made in one and the same reactor and under identical conditions. This was done to reliably establish the correlation existing between the experimental steps and the test results.

EXAMPLE 1: (Comparative Example)

A jacketed reactor 1.5 m high with an internal diameter of 5 cm was fed with 5 liters of a Nieuwland catalyst solution, which was taken from a commercial reactor and which was composed of:

33.4 weight percent of copper (I) chloride,
25.0 weight percent of potassium chloride,
0.1 weight percent of hydrogen chloride, and
41.5 weight percent of water.
The solution had a density of 1600 g/l at 80°C.

The catalyst solution was heated to 80°C and a gas mixture of 560 normal liters/hr (S.T.P.) of acetylene and 190 normal liters/hr of nitrogen was introduced thereinto, through the bottom portion of the reactor.

The following reaction conditions were maintained constant:

| | |
|---|---|
| Reaction temperature: | 80°C |
| Gas pressure at reactor inlet: | 0.2 atm. (gauge) |
| Gas load: | 150 liters of gas/1 of catalyst |
| Composition of gas: | 75 % by volume of acetylene |
| | 25 % by volume of nitrogen. |

The gas coming from the reactor was subjected to gas-chromatography and the results obtained were used to identify the acetylene conversion rate and yield of monovinylacetylene. Three tests were made and evaluated so as to obtain a mean value which is indicated in the Table hereinafter.

EXAMPLE 2: (Invention)

The procedure was the same as that described in Example 1 save that 50 percent by volume (2.5 liters) of the catalyst solution were replaced by the "Arsol" solvent which had the following composition, in weight percent:

| | |
|---|---|
| Xylenes: | 1.5 |
| Pseudocumene: | 16.5 |
| Cumene: | 2.5 |
| Indan: | 61.0 |
| Mesitylene: | 11.5 |
| Tetralin: | 7.0 |

The boiling range was between 160° and 205°C.

The reaction gas was analyzed and the test results were evaluated in a manner analogous to that described in Example 1. The results obtained are indicated in the Table hereinafter.

The catalyst liquid in the production plant remained clear and did not require replacement, even after continuous operation for 1 year. The conversion rates and yields remained substantially the same; disturbances could no be found to occur.

TABLE

| Example | 1 | 2 |
|---|---|---|
| Acetylene conversion rate (%) | 17.5 | 17 |
| Yield, based on acetylene converted (%) | | |
| Monovinylacetylene | 77.75 | 90.2 |
| Divinylacetylene | 15.3 | 5.2 |
| Acetaldehyde | 5.85 | 4.6 |
| Vinyl chloride | 0.27 | 0.2 |
| 2-chlorobutadiene-(1.3) | 0.97 | 0.1 |

We claim:

1. A process for making monovinylacetylene by introducing acetylene, at temperatures between 40° and 100°C and under acetylene gas pressures between 0.01 and 10 atmospheres (gauge), into an aqueous, hydrochloric acid solution of copper (I) chloride (Nieuwland catalyst type solution), comprising adding to the catalyst solution an organic monovinylacetylene-solvent boiling at temperatures higher than substantially 150°C, being immiscible with the said solution and containing at least 40 weight percent of indan together with further mononuclear aromates; mechanically dispersing the said catalyst solution and the said solvent by introducing acetylene thereinto so as to obtain a homogeneous catalyst liquid having between 25 and 85 weight percent by volume of the solvent therein; continually stripping off monovinylacetylene from the dispersed solvent, which is saturated with monovinylacetylene, by introducing an excess of acetylene gas thereinto; and recovering pure monovinylacetylene from the issuing gas mixture.

2. A process as claimed in claim 1, wherein the solvent is a coke plant-product substantially of the following composition, in weight percent:

| | |
|---|---|
| Xylenes: | 1 – 2 |
| Cumene: | 2 – 5 |
| Mesitylene: | 5 – 15 |
| Pseudocumene: | 10 – 20 |
| Indan: | 40 – 80 |
| Tetralin: | 5 – 15 |

3. A process as claimed in claim 1, wherein the catalyst liquid has between 40 and 60 percent by volume of the said solvent therein.

* * * * *